US 6,568,163 B1

(12) United States Patent
Franet

(10) Patent No.: US 6,568,163 B1
(45) Date of Patent: May 27, 2003

(54) CONVEYOR ARRANGEMENT POSITIONED WITHIN MOWER SUSPENSION LINKS

(75) Inventor: Roger Franet, Sarrequemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/679,273

(22) Filed: Oct. 4, 2000

(30) Foreign Application Priority Data

Oct. 23, 1999 (DE) ........................................ 199 51 183

(51) Int. Cl.[7] .............................................. A01D 34/00
(52) U.S. Cl. ........................ 56/14.3; 56/14.5; 56/14.9
(58) Field of Search ............................. 56/14.3, 14.4, 56/14.5, 15.7, 15.8, 15.9, DIG. 3, DIG. 10, 7, 249, 249.5, 253, 294, DIG. 14, DIG. 20, 14.9, 15.6, 16.1, 16.2

(56) References Cited

U.S. PATENT DOCUMENTS

| | | | |
|---|---|---|---|
| 2,056,344 A | * 10/1936 | Darnell | 56/219 |
| 2,850,863 A | * 9/1958 | Pierson | 56/192 |
| 3,151,429 A | * 10/1964 | Dyrdahl | 56/15.9 |
| 3,608,286 A | * 9/1971 | Lausch et al. | 56/14.4 |
| 3,695,015 A | * 10/1972 | Twidale et al. | 56/181 |
| 3,780,506 A | * 12/1973 | Tashiro | 56/14.5 |
| 4,182,098 A | 1/1980 | Kass | |
| 4,185,445 A | * 1/1980 | Van Der Lely | 56/6 |
| 4,392,339 A | 7/1983 | Berlivet et al. | |
| 4,429,517 A | * 2/1984 | Lohrentz et al. | 56/181 |
| 4,512,140 A | 4/1985 | Blakeslee | |
| 4,519,190 A | * 5/1985 | Blakeslee | 56/181 |
| 5,031,393 A | * 7/1991 | Rostoucher | 56/154 |
| 5,076,042 A | * 12/1991 | Koorn et al. | 56/6 |
| 5,177,944 A | 1/1993 | Finlay | |
| 5,203,154 A | * 4/1993 | Lesher et al. | 56/366 |
| 5,350,020 A | * 9/1994 | Vandever et al. | 171/26 |
| 5,722,222 A | * 3/1998 | Walters et al. | 56/6 |
| 5,799,474 A | * 9/1998 | Ingram | 56/14.5 |
| 6,212,865 B1 | * 4/2001 | Peeters et al. | 56/366 |

FOREIGN PATENT DOCUMENTS

| | | |
|---|---|---|
| CA | 1 183 355 | 3/1985 |
| CH | 607 841 | 11/1978 |
| DE | 25 387 | 5/1963 |
| DE | 132 750 | 11/1978 |
| DE | 297 19 765 U1 | 2/1999 |
| EP | 0 439 991 | 8/1991 |
| FR | 2 627 941 | 3/1988 |
| GB | 13 068 | of 1915 |
| GB | 2 186 473 | 8/1987 |
| GB | 2 215 971 | 10/1989 |
| WO | WO 93 05641 | 4/1993 |

* cited by examiner

Primary Examiner—Robert E. Pezzuto
Assistant Examiner—Árpád Fab Kovács

(57) ABSTRACT

A vehicle, in the form of a self-propelled forage harvester, has a three-point hitch assembly mounted to its forward end in place of the cutter head. A mower together with a rotary tine crop conditioner is coupled to the three-point hitch. Located in a zone between the upper and lower three-point hitch links, as viewed from the side, is a belt conveyor mounted to a hitch support structure for vertical pivotal movement between a raised, non-operative position and a lowered operative position. When in its non-operative position, the conveyor parallels the upper link and is disposed for letting cut crop discharged by the conditioner fall to the ground along a path that passes between front and rear pairs of support wheels of the forage harvester. When in its operative position, the conveyor is disposed at a 45° angle to the horizontal so as to be in the path of the cut crop discharged by the conditioner, the conveyor having a lateral extent such as to deposit the crop in a windrow located outside a selected one of the front pair of support wheels.

11 Claims, 2 Drawing Sheets

CONVEYOR ARRANGEMENT POSITIONED WITHIN MOWER SUSPENSION LINKS

BACKGROUND OF THE INVENTION

DE-U-297 19 765 discloses a vehicle with three mowing devices, one of which is mounted on the front of the vehicle. This front mowing device discharges the mowed crop in the center rearward onto the ground. During travel, the swath so formed passes through the region between the wheels of the vehicle.

The problem underlying the invention is seen in the fact that crop buildup occurs in the free space between the wheels in large swaths.

SUMMARY OF THE INVENTION

According to the present invention there is provided an improved self-propelled mower having a front mowing device.

An object of the invention is to provide a self-propelled mower having a front mowing device and constructed in such a way that crop buildup between the wheels is avoided.

A further object of the invention is to provide a self-propelled mower, as defined in the previous object, but having in addition, structure for positioning a swath of crop cut by the front mowing device next to a swath of a mowing device at its side in order to form a double swath.

A more specific object of the invention is to provide a self-propelled mower as defined in the previous objects wherein a conveyor is provided for intercepting and conveying sideways crop discharged rearwardly by the front mowing device.

Still a more specific object is to provide a mowing device having a conveyor as set forth in the immediately preceding object wherein the conveyor is mounted for being pivoted between a raised non-working position, and a lowered working position.

These and other objects will become apparent from reading the ensuing description together with the appended drawing.

DESCRIPTION OF THE PREFERRED EMBODIMENT

Figure 1:
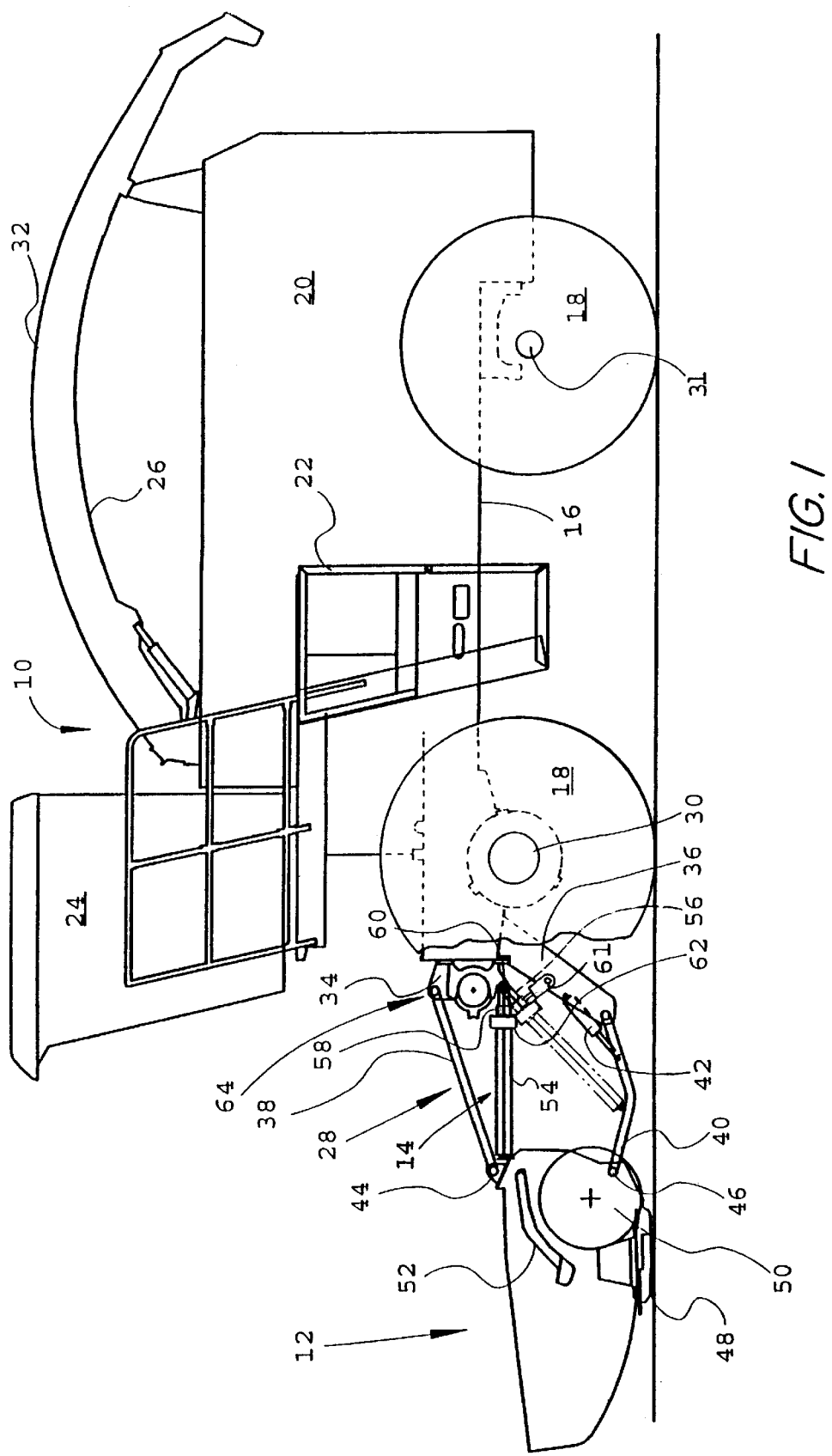
FIG. 1 is a left side elevational view of a self-propelled mower embodying the structure of the present invention.
Figure 2:
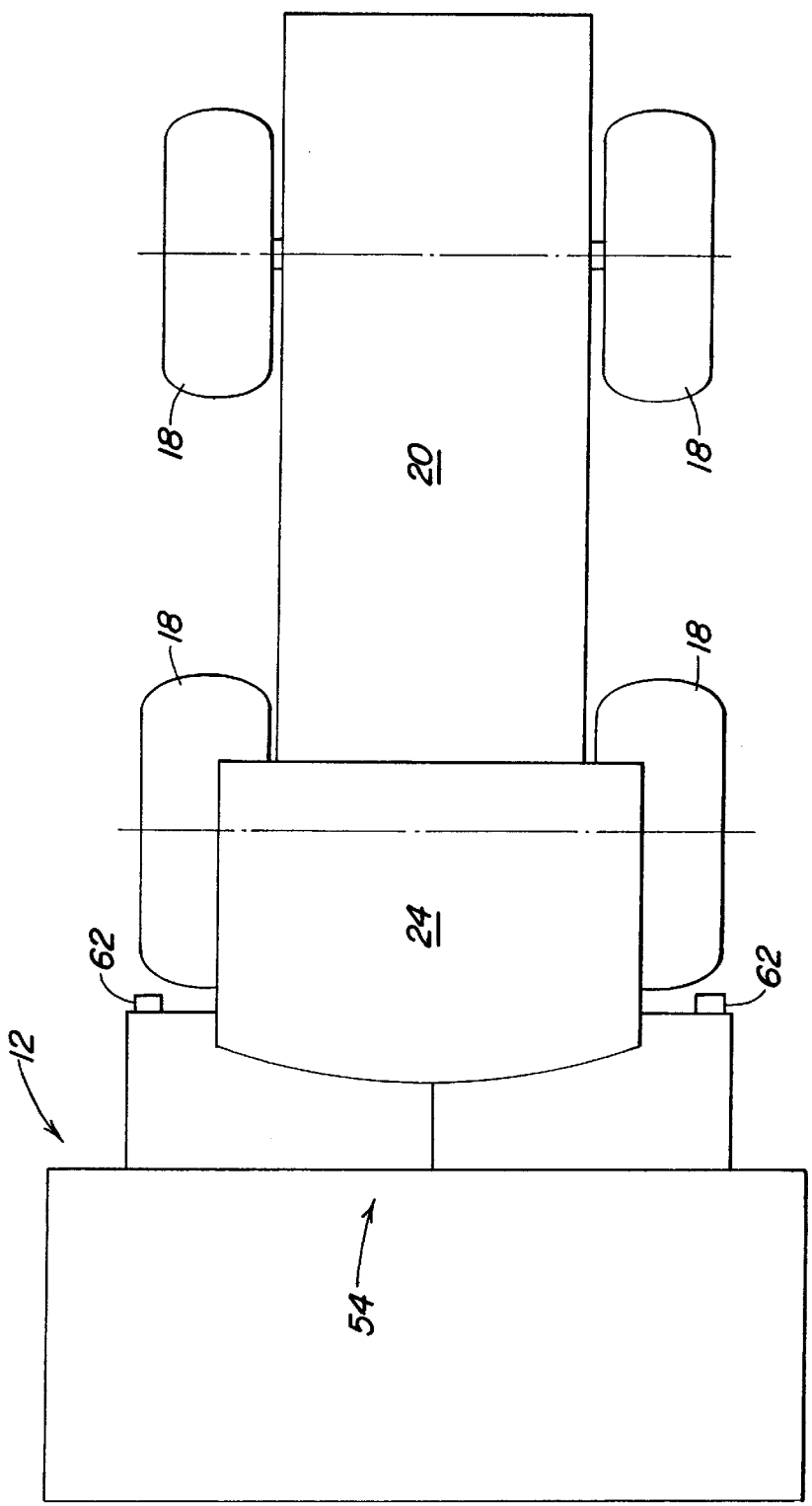
FIG. 2 is a schematic top view of the self-propelled mower shown in FIG. 1, but omitting the ladder and discharge spout.

The single figure shows a vehicle 10 with a front mounted mower 12 and a conveyor 14 arranged between the two.

The vehicle 10 in this case is designed essentially as a self-propelled field chopper and includes among other things, a frame 16, wheels 18, a housing 20, a mounting ladder 22, a driver's cab 24, a discharge spout 26 and a hitch 28.

This invention is not restricted to the connection with a self-propelled field chopper, but can also be used on a vehicle designed as a farming tractor, combine harvester or the like. Moreover, mounting of mower 12 need not occur on the front of vehicle 10, but on the side lying in the direction of travel. Thus, a farming tractor designed to operate in reverse could also serve as the vehicle 10.

The frame 16 is supported via wheels 18 on the ground and carries the hitch 28 on its end positioned in the front in the direction of travel. All other components of vehicle 10 are mounted on frame 16.

The wheels 18 cooperate with an axle 30, that accommodates them, and the ground to define a free space in which, if necessary, the mowed crop released by mower 12 can become positioned as a swath. Actually, a limitation on the height of the space that is available to accommodate crop is determined by the height of a rear axle 31 since it lies lower than the front axle 30.

The housing 20 envelopes a motor, drive components and part of the discharge spout 26 and is essentially closed on the bottom with frame 16. The mounting ladder 22 extends behind and over the front left wheel 18 and leads to the driver's cab 24 which is situated on the frame in front of the housing 20 and above the front wheels 18.

The crop discharge spout 26, of which only the curved end portion 32 is shown, is situated between the front wheels 18 and picks up, in an integrated field chopper, the chopped harvested crop from a chopper device, which normally would occupy the space where the hitch 28 is located.

The hitch 28 is assembled from a main support 64 fixed to a forward end location of the frame 16 and including an upper, central support section 34, and a pair of transversely spaced, lower support sections 36. The rear end of an upper connecting rod or link 38 is pivotally attached to the upper support section 34 and the rear ends of a pair of lower connecting rods or links 40 are respectively pivotally coupled to the lower support sections 36. The hitch 28, which is known per se, serves for connecting the mower 12 to the vehicle 10 for selected vertical movement relative to the vehicle 10. For this purpose, a linear hydraulic motor 42 is provided on each side between adjacent ones of the lower connecting rods 40 and the lower support sections 36. If the hydraulic motors 42 are extended, the lower connecting rods 40 descend, and if the motors are retracted, the lower connecting rods 40 are raised. The hydraulic motors 42 are arranged so that they do not reach the motion region of the conveyor 14.

The number of connecting rods 38 and 40 can vary, however, at least three connecting rods must always be provided, which are arranged in the fashion of a parallelogram, as viewed from the side.

The forward end of the upper connecting rod 38 is pivotally connected to an upper mounting lug 44 provided on the mower 12. Similarly, forward ends of the lower connecting rods 40 are respectively pivotally connected to lower rear locations of the mower 12 by pivot pins 46. The connecting rods 38 and 40 are designed relatively long in order to achieve sufficient free space for the conveyor 14. The lower connecting rods 40 are bent downward over roughly half their length in order to provide additional clearance for allowing the conveyor 14 to pivot downward an increased distance as compared to what would be possible if the lower connecting rods 40 were straight. Thus, the mower 12 is mounted by means of the hitch 28 on the front of vehicle 10 and can be raised to different heights by means of the hydraulic motors 42 in order to achieve different cutting heights.

The mower 12 can be designed essentially in any way, for example, as a disk mower, drum mower or blade mower, and has a cutter bar 48 with a cutting width that usually exceeds the width of vehicle 10. A mowed crop conditioning unit 50 is provided in known fashion spaced to the rear and upward of the cutter bar 48, and, in the practical example, is designed as an overhead conveying tined rotor, releasing the mowed crop rearward into the region of the conveyor 14 or between the front wheels 18. A guide plate 52 is provided above the mowed crop conditioning unit 50 and, if desired, can be equipped with guide elements (not shown) for forcing the mowed crop stream toward the center of the vehicle. In lieu of the tined conditioning unit 50, a pair of squeeze rolls may be used, or some other type of conditioner, rotary brushes, for example, may be used.

The conveyor 14 in the present example is designed as a belt conveyor, including an endless belt conveyor device 54 having two conveyor rolls 56 about which the belt extends. The design of the conveyor 14 as a belt conveyor has the advantage that it is constructed relatively flat and therefore requires little space under constricted conditions in the region of the suspension for the mower 12. Moreover, the belt conveyor device 54 is light and does not unduly stress the front axle of the vehicle 10.

The conveyor rolls 56 are connected to each other in a rigid frame 58 and can be pivoted vertically together around a horizontal transverse axis 60 on the support 64, for which purpose a control mechanism, here shown as a pair of extensible and retractable hydraulic motors 61, is provided. Driving of one of the conveyor rolls 56 occurs via a hydraulic motor 62 on the end of frame 58 mounted to the support 64. The hydraulic motor 62 can be driven in different directions and with different speeds, for which purpose valves (not shown) controllable from the driver's cab 28 are provided. However, this is only a preferred variant that is not absolutely essential. The mounting of the conveyor frame 58 on the support 64 has the advantage that disassembly occurs very simply on the actual field chopper in that the hitch 28 is disassembled with support 64. Furthermore, by mounting the conveyor 14 from the support 64, its weight is not borne by the connecting rods 38 and 40, whereby the sizes of the connecting rods and the hydraulic motors 42 may be kept somewhat smaller than they would have to be if it were necessary for them to carry the weight of the conveyor 14.

The conveyor 14 extends at least over the width of the discharge opening of mower 12 and extends roughly to the outer edge of at least one wheel 18. The length in each case is dimensioned so that the conveyor 14 can convey the mowed crop to a site that lies to the outside of a desired one of the wheels 18. A conveyor structure is possible wherein the conveyor device 54 is divided into left and right sections disposed end to end, with each section being equipped with a variable speed, reversible hydraulic motor, like motor 62. With this type of arrangement, the motors may be operated in the same or opposite directions so as to deliver crop all to the left or to the right of the vehicle 10 or half of the crop each way.

The width of conveyor device 54, i.e., its dimension transverse to its length, is chosen so that the maximum amount of released mowed crop can be accommodated.

It is apparent from the drawing that the conveyor 14 can assume an upper, essentially horizontal non-operating position, shown in solid lines, and a lower operating position inclined at an angle of about 45° from the horizontal, shown in dashed lines. In the non-operating position, the conveyor 14 extends above the discharge opening and allows the mowed crop to reach the ground beneath it. In the operating position, the conveyor device 54 is situated in the trajectory of the mowed crop, intercepts it and discharges it to one or the other side. Although not shown, a deflector plate can be provided on the vehicle side of conveyor 14, which prevents the mowed crop from falling onto the frame 58 or hydraulic motor 62.

The following function is obtained after all this.

The vehicle 10 is equipped with the mower 12 by means of the hitch 28 and is used on a field in order to mow grass, for example. Mowed crop separated from the ground by the cutter bar 48 is fed to the crop conditioning unit 50, which releases it rearward.

If the conveyor 14 is in its non-operating position, the mowed crop falls onto the ground and forms a swath in the center of the vehicle 10 between its wheels 18.

If the conveyor 14 is in its operating position, the mowed crop reaches conveyor 54 and is conveyed to the left or right according to its direction of running, where it is released onto the ground at a location laterally outward relative to one of the wheels 18.

What is claimed is:

1. In a vehicle having a frame supported on front and rear pairs of transversely spaced wheels with a mower mounted on a front of said frame, as considered in the direction of travel, and operable for delivering a swath of cut crop along a path extending fore-and-aft between said pairs of wheels, the improvement comprising: a hitch structure extending between said frame and said mower including at least one upper connection rod and a pair of lower connection rods; a conveyor having a conveyor device running across the direction of travel of said vehicle; a sole mounting structure for said conveyor coupling said conveyor only to said frame such that said conveyor device extends in said direction of travel between said mower and said vehicle, and transverse to said direction of travel below said at least one upper connection rod and above said lower connection rods in an operating position for intercepting the cut crop delivered by the mower; and said conveyor device having a length and disposition for delivering the crop to a location outside at least one of said front pair of wheels.

2. The vehicle according to claim 1 wherein said sole mounting structure for said conveyor establishes a horizontal transverse pivot axis about which said conveyor device is selectively movable between said operating position and a raised, non-operating position wherein said conveyor device is located for permitting the crop to fall undisturbed to the ground.

3. The vehicle according to claim 1 wherein said conveyor device is a belt conveyor.

4. The vehicle according to claim 3 wherein a reversible, variable speed drive element is coupled to said conveyor device.

5. The vehicle according to claim 1 wherein a hitch mounting support is releasably mounted to said front of said frame; and said sole mounting structure for said conveyor establishing a connection between said conveyor and said hitch mounting support; and rear ends of said connection rods being mounted to said hitch mounting support, whereby the conveyor and hitch connection rods can be removed from said frame together with said hitch mounting support.

6. The vehicle according to claim 2 wherein said lower connection rods are each bowed downwardly between front and rear ends thereof so that additional space is provided for permitting movement of said conveyor device between said operating and non-operating positions.

7. The vehicle according to claim 1, wherein said mower is wider than said vehicle and said conveyor is arranged so that it places the mowed crop in the region between a side edge of said mower and a side edge of said vehicle.

8. The vehicle according to claim 1 wherein said mower includes a transverse cutter bar; and a crop conditioning unit being mounted between said cutter bar and said conveyor.

9. The vehicle according to claim 1 wherein said conveyor is hydraulically driven.

10. The vehicle according to claim 1 wherein said vehicle is designed as a self-propelled field chopper having a front adapted for receiving a chopper head; said hitch structure including a support fixed to said front of said frame in lieu of said chopper head; and said connection rods having rear ends vertically pivotally coupled to said support.

11. The vehicle according to claim 1 wherein said conveyor device is a belt conveyor including left and right conveyor device sections disposed in end-to-end relationship; a reversible drive element being coupled to each conveyor device section whereby said conveyor device sections can be driven in the same or opposite directions.

* * * * *